US008082394B2

(12) United States Patent
Nagai et al.

(10) Patent No.: US 8,082,394 B2
(45) Date of Patent: Dec. 20, 2011

(54) COMPUTER SYSTEM, STORAGE SYSTEM AND METHOD FOR EXTENDING VOLUME CAPACITY

(75) Inventors: Takayuki Nagai, Machida (JP); Masayuki Yamamoto, Sagamihara (JP); Masayasu Asano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/538,238

(22) Filed: Aug. 10, 2009

(65) Prior Publication Data

US 2009/0300285 A1 Dec. 3, 2009

Related U.S. Application Data

(63) Continuation of application No. 11/253,148, filed on Oct. 17, 2005, now abandoned.

(30) Foreign Application Priority Data

Sep. 2, 2005 (JP) ................................. 2005-255106

(51) Int. Cl.
*G06F 12/00* (2006.01)
(52) U.S. Cl. .............................. 711/114; 711/4; 711/112
(58) Field of Classification Search .............. 711/4, 112, 711/114
See application file for complete search history.

(56) References Cited

U.S. PATENT DOCUMENTS

| 4,430,701 | A | 2/1984 | Christian et al. |
| 5,796,580 | A | 8/1998 | Komatsu et al. |
| 5,900,007 | A | 5/1999 | Nunnelley et al. |
| 5,901,327 | A | 5/1999 | Ofek |
| 6,631,442 | B1 | 10/2003 | Blumenau |
| 6,665,743 | B2 | 12/2003 | Benhase et al. |
| 6,681,291 | B2 | 1/2004 | Ikeuchi et al. |
| 6,725,328 | B2 | 4/2004 | Kano et al. |
| 6,772,283 | B2 | 8/2004 | Taroda et al. |
| 6,857,059 | B2 | 2/2005 | Karpoff et al. |
| 6,898,670 | B2 | 5/2005 | Nahum |

(Continued)

FOREIGN PATENT DOCUMENTS

JP 63-314642 A 12/1988

(Continued)

OTHER PUBLICATIONS

Hough, Geoffrey, "3PAR Thin Provisioning", 3PARdata, Inc., Jun. 2003, pp. 1-14.

(Continued)

*Primary Examiner* — Midys Rojas
(74) *Attorney, Agent, or Firm* — Mattingly & Malur, PC

(57) ABSTRACT

The object of the present invention is to prevent distribution of a storage range to a volume from an inappropriate disk drive based on use of the volume as a result of an automatic extension of a volume capacity. A computer system has a storage system including a physical storage device, a host computer, and a management computer. The storage system includes a plurality of kinds of physical storage devices physically dividing into two segments or more the volume and records as constitution information the correspondence between each segment and the volume using the segment. And the storage system records the kind of physical storage device to be allocated to the volume and selects the physical storage device according to the kind of stored physical storage device for allocation of the segment when the host computer performs an I/O access to the volume. Access frequency is monitored and data is copied based on the monitored access frequency.

20 Claims, 16 Drawing Sheets

U.S. PATENT DOCUMENTS

| | | |
|---|---|---|
| 6,983,353 B2 | 1/2006 | Tamer et al. |
| 7,093,068 B2 | 8/2006 | Yamagami |
| 7,162,600 B2 * | 1/2007 | Kano et al. .................... 711/162 |
| 2002/0019908 A1 | 2/2002 | Reuter et al. |
| 2002/0049823 A1 | 4/2002 | Tomita et al. |
| 2002/0103969 A1 | 8/2002 | Koizumi et al. |
| 2002/0112113 A1 | 8/2002 | Karpoff et al. |
| 2002/0129216 A1 | 9/2002 | Collins |
| 2002/0152143 A1 | 10/2002 | Sanada et al. |
| 2002/0188768 A1 | 12/2002 | Hirakawa et al. |
| 2003/0009619 A1 | 1/2003 | Kano et al. |
| 2003/0070043 A1 | 4/2003 | Merkey |
| 2003/0101317 A1 | 5/2003 | Mizuno et al. |
| 2003/0225982 A1 | 12/2003 | Fujita et al. |
| 2003/0229698 A1 | 12/2003 | Furuhashi et al. |
| 2004/0054850 A1 | 3/2004 | Fisk |
| 2004/0078542 A1 | 4/2004 | Fuller et al. |
| 2004/0215749 A1 | 10/2004 | Tsao |
| 2004/0215879 A1 | 10/2004 | Matsunami et al. |
| 2005/0055603 A1 | 3/2005 | Soran et al. |
| 2005/0076263 A1 | 4/2005 | Tomita |
| 2005/0108235 A1 | 5/2005 | Sato et al. |
| 2005/0138285 A1 | 6/2005 | Takaoka et al. |
| 2005/0177683 A1 | 8/2005 | Isobe et al. |
| 2006/0101204 A1 | 5/2006 | Bao |
| 2007/0192560 A1 | 8/2007 | Furuhashi |
| 2008/0065853 A1 | 3/2008 | Yamagami |

FOREIGN PATENT DOCUMENTS

| | | |
|---|---|---|
| JP | 1-158528 A | 6/1989 |
| JP | 6-103123 A | 4/1994 |
| JP | 11-224164 | 8/1999 |
| JP | 2000-165794 A | 6/2000 |
| JP | 2002-132549 A | 5/2002 |
| JP | 2002-182859 A | 6/2002 |
| JP | 2004-013547 | 6/2002 |
| JP | 2002-366398 A | 12/2002 |
| JP | 2003-015915 | 1/2003 |
| JP | 2003-162377 A | 6/2003 |
| JP | 2003-296154 A | 10/2003 |
| JP | 2005-4349 A | 1/2005 |
| JP | 2005-108098 A | 4/2005 |
| JP | 2005-149283 A | 6/2005 |
| JP | 2005-182274 A | 7/2005 |
| JP | 2005-222429 A | 8/2005 |

OTHER PUBLICATIONS

U.S. Appl. No. 60/209,109, filed Jun. 2, 2000, Reuter et al.
U.S. Appl. No. 60/209,326, filed Jun. 2, 2000, Reuter et al.

* cited by examiner

FIG.4

VOLUME ADDRESS LIST 25100

| DISK DRIVE ID 25110 | SEGMENT ID 25120 | LOGICAL BLOCK ADDRESS 25130 | VOLUME ALLOCATION STATE 25140 |
|---|---|---|---|
| DISK1 | SEG1 | 0-999 | ALLOCATED |
|  | SEG2 | 1000-1999 | ALLOCATED |
|  | SEG3 | 2000-2999 | ALLOCATED |
| DISK2 | SEG4 | 0-999 | ALLOCATED |
|  | SEG5 | 1000-1999 | NOT ALLOCATED |
| DISK3 | SEG6 | 0-999 | ALLOCATED |
|  | SEG7 | 1000-1999 | NOT ALLOCATED |
| : | : | : | : |

FIG.5

VOLUME LIST 25200

| VOLUME ID 25210 | SEGMENT ID 25220 | LOGICAL BLOCK ADDRESS 25230 |
|---|---|---|
| VOL1 | SEG1 | 0-999 |
|  | SEG2 | 1000-1999 |
|  | SEG4 | 2000-2999 |
| VOL2 | SEG3 | 0-999 |
| VOL3 | SEG6 | 0-999 |
| : | : | : |

FIG.8

DISK DRIVE LIST

| DISK DRIVE ID | DISK DRIVE TYPE | RAID LEVEL | I/O FREQUENCY |
|---|---|---|---|
| DISK1 | FC | RAID5 | 100 |
| DISK2 | S-ATA | RAID5 | 50 |
| DISK3 | FC | RAID1 | 10 |
| : | : | : | : |

VOLUME CHARACTERISTIC LIST

| VOLUME ID | CHARACTERISTIC | USABLE DISK |
|---|---|---|
| VOL1 | HIGH RELIABILITY (FC) | DISK1, DISK3 |
| VOL2 | LOW COST (S-ATA) | DISK2 |
| VOL3 | HIGH RELIABILITY (FC), RAID1 | DISK3 |
| : | : | : |

I/O FREQUENCY RECORD 33310   33320   33330              33300

| VOLUME ID | SEGMENT ID | I/O FREQUENCY | | |
|---|---|---|---|---|
| | | PRESENT | AVERAGE FOR PAST 24 HOURS | AVERAGE FOR PAST 1 WEEK |
| VOL1 | SEG1 | 100 | 200 | 180 |
| | SEG2 | 10 | 10 | 8 |
| | SEG4 | 80 | 70 | 30 |
| VOL2 | SEG3 | 100 | 150 | 130 |
| VOL3 | SEG6 | 50 | 30 | 40 |
| : | : | : | : | : |

FIG.14

PERMISSIBLE RANGE OF I/O FREQUENCY LIST 33410   33420              33400

| DISK DRIVE TYPE | PERMISSIBLE RANGE OF I/O FREQUENCY | | |
|---|---|---|---|
| | PRESENT | AVERAGE FOR PAST 24 HOURS | AVERAGE FOR PAST 1 WEEK |
| FC | 50 OR MORE | 30 OR MORE | 30 OR MORE |
| S-ATA | 100 OR LESS | 50 OR LESS | 50 OR LESS |

FIG.19

VOLUME LIST 13300

| STORAGE DEVICE ID 13310 | VOLUME ID 13320 | LOGICAL BLOCK ADDRESS 13330 | VOLUME ALLOCATION STATE 13340 |
|---|---|---|---|
| ARRAY1 | VOL1 | 0-999 | ALLOCATED |
|  | VOL2 | 0-999 | ALLOCATED |
|  | VOL3 | 0-999 | ALLOCATED |
| ARRAY2 | VOL4 | 0-999 | ALLOCATED |
|  | VOL5 | 0-999 | NOT ALLOCATED |
| ARRAY3 | VOL6 | 0-999 | ALLOCATED |
|  | VOL7 | 0-999 | NOT ALLOCATED |
| : | : | : | : |

FIG.20

VIRTUAL VOLUME LIST 13400

| VIRTUAL VOLUME ID 13410 | VOLUME ID 13420 | LOGICAL BLOCK ADDRESS 13430 |
|---|---|---|
| V-VOL1 | VOL1 | 0-999 |
|  | VOL2 | 1000-1999 |
|  | VOL4 | 2000-2999 |
| V-VOL2 | VOL3 | 0-999 |
| V-VOL3 | VOL6 | 0-999 |
| : | : | : |

COMPUTER SYSTEM, STORAGE SYSTEM AND METHOD FOR EXTENDING VOLUME CAPACITY

This is a continuation application of U.S. Ser. No. 11/253,148, filed Oct. 17, 2005. The present application is based on and claims priority of Japanese patent applications No. 2005-255106 filed on Sep. 2, 2005. The entire disclosures of the above-identified applications are hereby incorporated by reference.

BACKGROUND

The present invention relates to a method for extending a volume capacity when monitoring a storage system used for a computer system, in particular, when writing into the storage system from a host computer.

Generally speaking, a computer system comprises a host computer for executing jobs and a storage system for reading/writing data in response to directives of the host computer. The storage system has a plurality of disk drives for storing and reading data. The storage system provides a storage region to the host computer as a volume. The capacity of the volume can be extended at any time if necessary. For example, when the host computer uses up the volume provided by the storage system, the volume capacity can be extended by creating a storage region from an unused disk capacity in the storage system and by the host computer combining the storage region with the volume being used. Such a technique is called on-line volume extension.

Japanese Unexamined Patent Application Publication No. 2003-15915 describes a method in which a storage system creates a storage region from an unused region in a disk drive while the host computer is being on-line and dynamically adds the storage region to a storage region of a volume when the capacity of the volume in the storage system is running short due to writing from the host computer. Such a technique is called volume capacity automatic extension. By the volume capacity automatic extension, an on-line volume can be extended automatically without intervention of a storage manager.

According to the present invention, prior to creating a volume, a storage manager determines a characteristic corresponding to the way of use. When automatically extending a volume capacity, the storage system adds to the volume a storage capacity in a disk drive corresponding to the characteristic of the volume.

Thus, the present invention relates to a computer system having a storage system including a physical storage device, a host computer being connected to the storage system via a network and reading/writing data in a volume, and a management computer with an interface for connecting to the storage system and to the host computer via the network and for receiving a constitution change directive from a user, the storage system including a plurality of kinds of physical storage devices physically dividing into two segments or more the volume as a storage region used by the host computer, recording as constitution information the correspondence between each segment and the volume using the segment, recording the kind of physical storage device to be allocated to the volume, and selecting the physical storage device according to the kind of stored physical storage device for allocation of the segment when the host computer performs an I/O access to the volume.

SUMMARY

Generally speaking, a storage system comprises a plurality of kinds of disk drives therein and uses a high-performance, reliable, expensive disk drive or a low-performance, unreliable, low-cost disk drive according to the way of use. To be more specific, data which are frequently used are allocated to a storage region in the expensive disk drive while data which are not frequently used such as data archives are allocated to a storage region in the low-cost disk drive.

When extending an on-line volume, a storage manager grasps the way of use of the volume in the host computer, creates a storage region from an appropriate disk drive according to the way of use, and allocates the storage region to the volume for capacity extension, and thereby, the volume can use the disk drive corresponding to the way of use as a storage region.

However, for the volume capacity automatic extension, a selection standard of the disk drive for creation of the volume is not taken into consideration, and addition of capacity to the volume is performed by creation of a storage region from any disk drive by the storage system. Accordingly, it might occur that a storage region of a low-cost disk is allocated to a volume which requires high performance and high reliability, resulting in decrease of performance and reliability of the volume. In contrast, it might also occur that a storage region of an expensive disk is allocated to a volume which requires provision of a low-cost storage region, resulting in increase of operation costs of the storage system. As described above, it is a challenge to prevent distribution of a storage range to a volume from an inappropriate disk drive comparing with use of the volume as a result of an automatic extension of a volume capacity.

According to the present invention, a storage manager can distribute a storage capacity to a volume from a disk drive conforming to characteristic of the volume prior to performing volume capacity automatic extension by previously providing characteristic corresponding to the way of use to the volume, thus preventing decrease of performance and reliability of the volume and increase of operation costs of a storage system.

BRIEF DESCRIPTION OF THE DRAWINGS

FIG. 4 shows an example of constitution diagram of a volume address list included in a storage device according to the present invention.

FIG. 5 shows an example of constitution diagram of a volume list included in a storage device according to the present invention.

FIG. 8 shows an example of constitution diagram of a management table disk included in a storage device of the first embodiment.

FIG. 9 shows an example of constitution diagram of a volume characteristic list included in a storage device of the first embodiment.

FIG. 13 shows an example of constitution diagram of an I/O frequency record included in a management computer of the second embodiment.

FIG. 14 shows an example of constitution diagram of a permissible range of I/O frequency list included in a management computer of the second embodiment.

FIG. 19 shows an example of a constitution diagram of volume list included in a host computer of the third embodiment.

FIG. 20 shows an example of constitution diagram of a virtual volume list included in a host computer of the third embodiment.

DESCRIPTION OF THE PREFERRED EMBODIMENTS

Hereinafter, preferred embodiments for realizing the present invention are described. In the following, the embodiments of the present invention are described with reference to the accompanying drawings.

First Embodiment

In the first embodiment, a method is described in which a storage manager gives a characteristic to a volume and adds a storage region from a disk drive conforming to the characteristic of the volume prior to performing volume capacity automatic extension.

Figure 1:
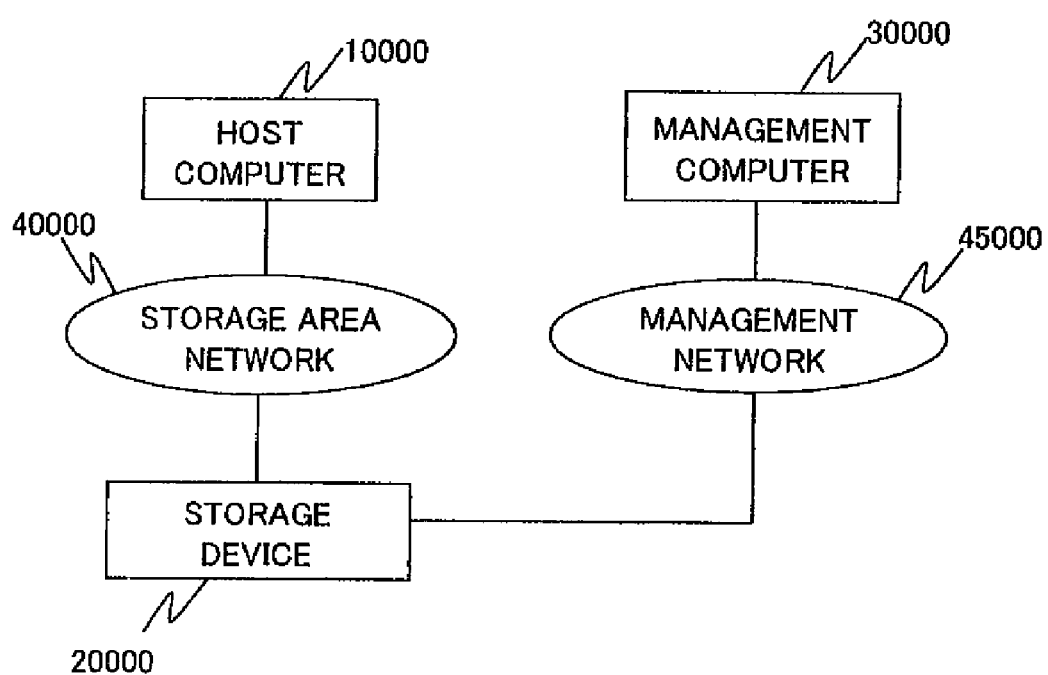
FIG. 1 shows an example of constitution diagram of a computer system according to the present invention.
Figure 2:
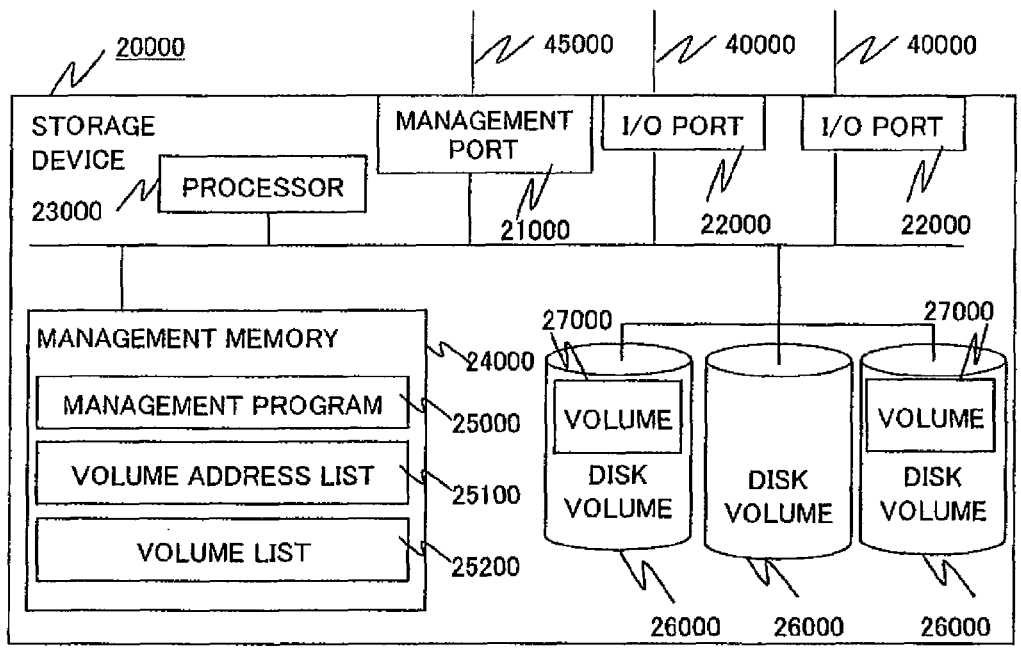
FIG. 2 shows an example of detailed constitution diagram of a storage device according to the present invention.
Figure 3:
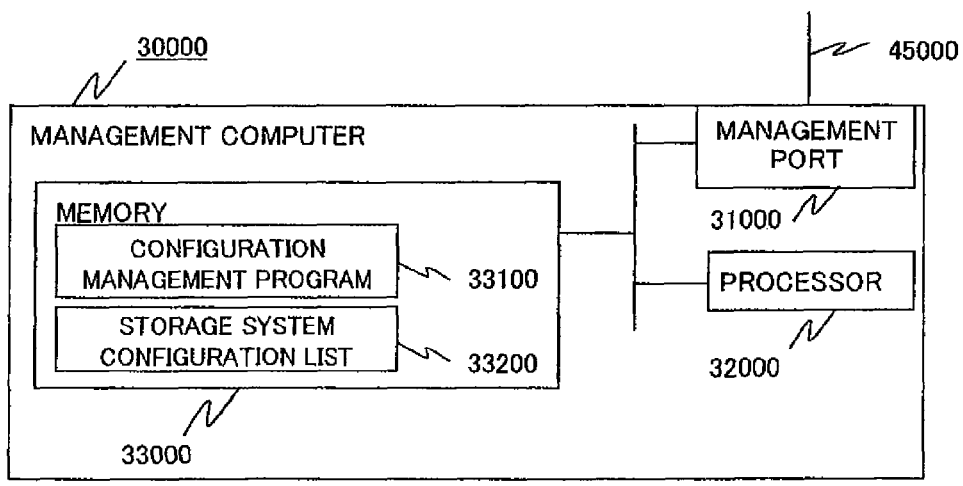
FIG. 3 shows an example of detailed constitution diagram of a management computer according to the present invention.

A system constitution and a program constitution as previously done are described. First, the nature of a conventional computer system before application of the first embodiment is described. FIGS. 1 to 3 show constitution of a computer system and those of devices connected to the computer system, and FIGS. 4 to 7 show management information included in each device.

FIG. 1 shows the constitution of the computer system. A storage device 20000 and a host computer 10000 are connected with each other by a storage network 40000. The storage device 20000 is connected to a network 45000 for management and to a management computer 30000. It is possible that the storage network 40000 and the network 45000 for management are the same network.

FIG. 2 shows an example of a detailed constitution diagram of the storage device (storage device) 20000. The storage device 20000 includes a management port 21000 for connection to the network 45000 for management, an I/O port 22000 for connection to the host computer via the storage network 40000, a processor 23000 for controlling the storage device, a management memory 24000 used by the processor 23000, and a disk volume 26000 for storing data provided to the host computer, all of which are connected to each other via a circuit such as an internal bus.

A management program 25000 of the storage device is included in the management memory 24000. A volume creation function and a volume capacity automatic extension function can be provided following the management program 25000. Though in the following, a program is described as the subject, a process part for executing the program (a processor 23000 for the storage device 20000, and similarly for the management computer 30000, the host computer 10000, and a switch 50000) actually performs the process. The volume creation function provides a volume 27000 with a limitless capacity to the host computer when the storage manager directs creation of a volume. That is, when the host computer 10000 accesses the volume 27000, the start value of a logical block number (LBA) for determining the range of the volume is defined to be 0 while the LBA as an end value of the range should not be defined. When the LBA as the end value of the range is defined, the value is a maximum capacity for the volume. The volume capacity automatic extension function will be described later in detail.

The management memory 24000 stores a volume address list 25100 as shown in FIG. 4 and a volume list 25200 as shown in FIG. 5.

A disk volume 26000 comprises one or more disk drives. When the disk volume 26000 comprises a plurality of disk drives, the disk drives might form redundant arrays of inexpensive disks (RAID) constitution. The disk volume 26000 is physically divided into a plurality of regions, which are called segments. The disk volume 26000 is logically divided into a plurality of volumes 27000.

FIG. 3 shows a detailed constitution of the management computer 30000. The management computer 30000 has a management port 31000 for connection to a network 45000 for management, a processor 32000, and a memory 33000, all of which are connected to each other via a circuit such as an internal bus. A configuration management program 33100 is stored in the memory 33000 to acquire constitution information from a storage device for displaying the constitution information to a storage manager and to execute a constitution information change directive received from the storage manager to the storage device. The configuration management program 33100 has a function for acquiring device constitution information from the storage device 20000 and for storing the constitution information in a storage system configuration list 33200 and a function for executing a volume creation directive received from the storage manager to the storage device.

FIG. 4 shows a constitution of a volume address list 25100 included in the storage device 20000. The volume address list 25100 comprises a field 25110 for registering a disk drive ID as an identifier of each disk volume in the storage device, a field 25120 for registering a segment table held by each disk volume, a field 25130 for registering a logical block address allocated to each segment, and a field 25140 for indicating whether or not each segment is allocated to the volume. The disk volume 26000 of the storage device is divided into fixed blocks, and an LBA is provided to each block.

FIG. 4 shows an example of specific values of a volume address list included in a storage device. That is, the storage device includes disk volumes indicated by disk drive IDs such as DISK1, DISK2. The disk volume DISK1 includes segments indicated by disk segment IDs such as SEG1, SEG2, SEG3, the disk volume DISK2 includes segments indicated by segments IDs such as SEG4, SEG5, and the disk volume DISK3 includes segments indicated by segment IDs such as SEG6, SEG7. Each segment includes a storage region in proportion to the logical block address held by the segment.

FIG. 5 shows the constitution of a volume list 25200 included in the storage device 20000. The volume list 25200 comprises a field 25210 for registering a volume ID as an identifier of each volume in the storage device, a field 25220 for registering a segment ID allocated to each volume, and a field 25230 for indicating to which LBA the allocated segment is positioned in the volume.

FIG. 5 shows an example of specific values of a volume list included in a storage device. That is, in the storage device, a volume VOL1 uses the segments SEG1, SEG2 and SEG4 as storage regions, and a volume VOL2 uses the segment SEG6 as a storage region.

Figure 6:
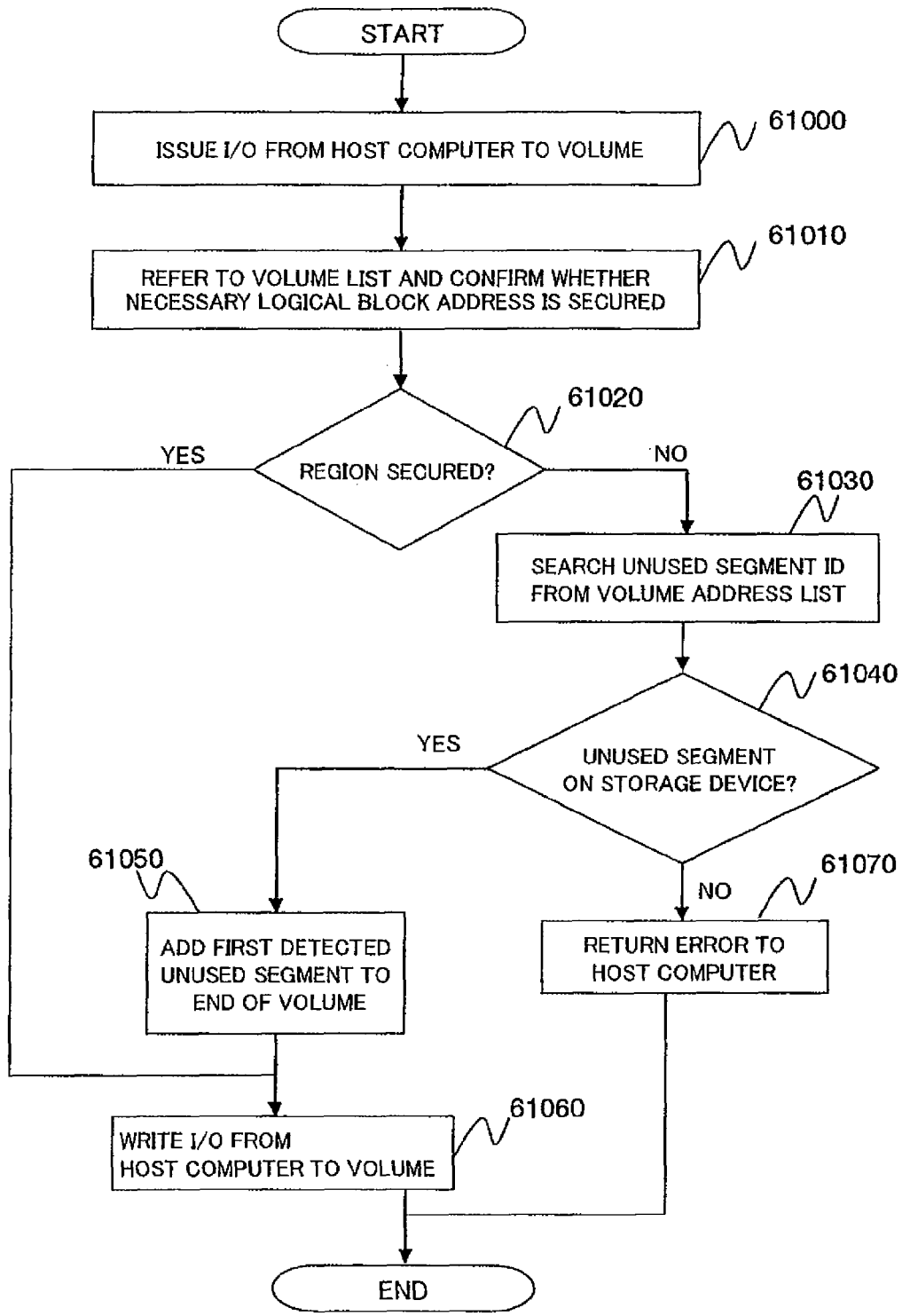
FIG. 6 shows a flowchart indicating an entire flow example of volume capacity automatic extending function executed by a storage device according to the present invention.

FIG. 6 shows a flowchart of a volume capacity automatic extension function held by a management program 25000. A host computer issues an I/O to the volumes in the storage devices (Step 61000). At that time, the management program 25000 refers to the volume list 25200 after detecting an LBA to be accessed on the volume and checks whether or not a secured region is larger than the LBA to be accessed (Step 61010). When the secured region is larger than the LBA, or a written region is secured (Step 61020), the I/O from the host computer is written into the volume (Step 61060).

On the other hand, when the secured region is smaller than the LBA, or a written region is not secured (Step 61020), the management program 25000 refers to the volume address list 25100 and searches for an unallocated segment for the volume (Step 61030). As a result of the search, when there is no unallocated segment (Step 61040), an error is returned to the host computer indicating that writing to the volume failed (Step 61070). When there is an unallocated segment (Step 61040), the first detected unallocated segment is added to the end of the volume (Step 61050). After that, the I/O from the host computer is written into the volume (Step 61060).

In the conventional system constitution and program constitution as described above, when a segment is added to a volume, the kind of a disk volume is not taken into consideration and selection of an unused segment is performed. Accordingly, when there is a plurality of kinds of disk volumes in the storage device, the problem might be that an expensive disk volume and a low-cost disk volume cannot be selectively used according to the way of use.

Figure 7:
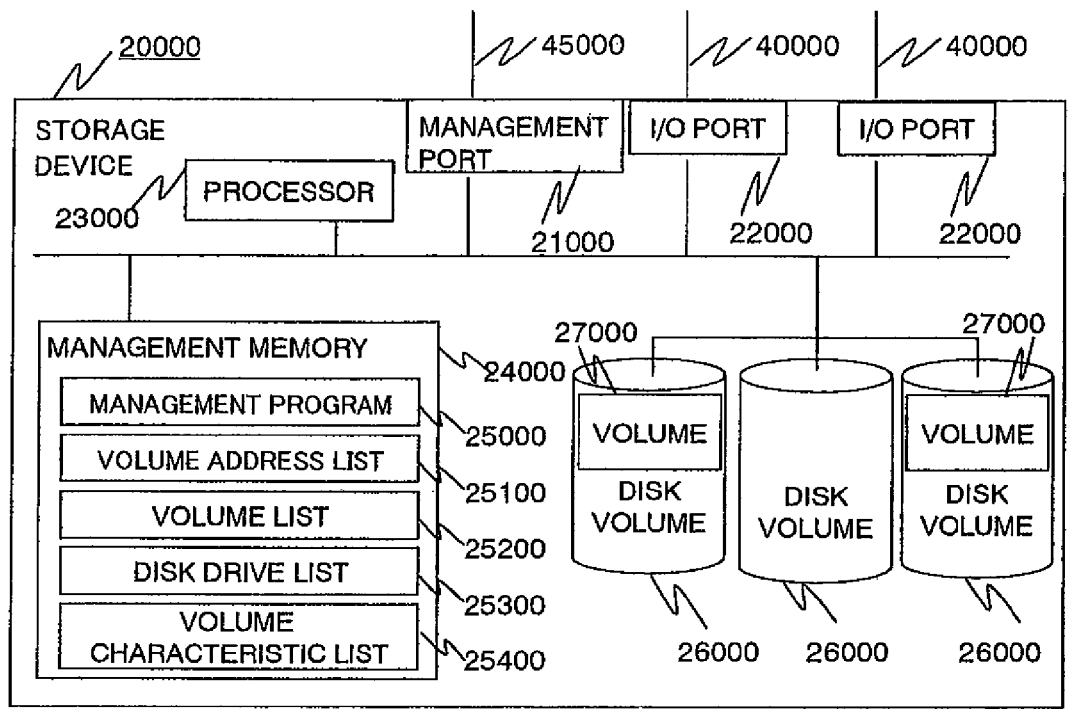
FIG. 7 shows an example of detailed constitution diagram of a storage device of a first embodiment.

Next, a system constitution and a program constitution of the first embodiment are described. First, the nature of a computer system after applying the first embodiment is described. FIG. 7 shows the constitution of a storage device, and FIGS. 8 and 9 show management information included in each device. The computer system and the management computer are constituted as in the manner of a conventional one shown in FIGS. 1 and 3, and the storage system is constituted by one or more storage devices, and hereinafter, they are only called 'storage device' without distinguishing them. A physical storage device is, for example, a disk drive, and corresponds to a RAID group or a single disk which is not RAID-constituted. The RAID group is RAID-constituted by a plurality of Fibre Channel (FC) disks or Serial Advanced Technology Attachment (S-ATA) disks.

FIG. 7 shows an example of detailed constitution of the storage device 20000. The constitution of the storage device is the same as the conventional one except for the addition of a disk drive list 25300 shown in FIG. 8 and a volume characteristic list 25400 shown in FIG. 9 to a management memory 24000.

FIG. 8 shows the constitution of the disk drive list 25300 included in the storage device 20000. The disk drive list 25300 comprises a field 25310 for registering a disk drive ID as an identifier of a disk volume in the storage device, a field 25320 for registering the kind of disk volume, a field 25330 for registering a RAID level of the disk volume when the disk volume comprises a plurality of disk drives, and a field 25340 for registering the I/O frequency from a host computer to the disk volume. In the present embodiment, it is assumed that as for the kind of disk volumes, there are two kinds of disks such as an FC disk as a high-performance expensive disk volume and an S-ATA disk as a low-performance low-cost disk volume. Actually, it is also possible that more kinds of disk volumes are in the storage device.

FIG. 8 shows an example of specific values of a disk drive list included in the storage device. That is, the storage device includes therein disk volumes indicated by disk drive IDs such as DISK1, DISK2, DISK3. The disk volumes DISK1 and DISK2 are constituted by RAID5, and the disk volume DISK3 is constituted by RAID1. The numbers of accesses from the host computer to the disk volumes DISK1, DISK2, DISK3 are 100, 50, and 10 per unit time period, respectively.

FIG. 9 shows the constitution of a volume characteristic list 25400 included in the storage device 20000. The volume characteristic list 25400 comprises a field 25410 for registering a volume ID as an identifier of a volume in the storage device, a field 25420 for registering the characteristic of the volume input when a storage manager creates the volume through a management computer, and a field 25430 for indicating a table of disk volume identifiers conforming to the characteristic of the volume.

FIG. 9 shows an example of specific values of a volume characteristic list included in the storage device. That is, it is shown that the storage device should hold three volumes indicated by volume IDs such as VOL1, VOL2, VOL3 and each volume should comprise a reliable disk volume, a low-cost disk volume and reliable RAID1 disk volume, respectively. The disk volumes conforming to the properties of VOL1, VOL2 and VOL3 are DISK1, DISK2 and DISK3, respectively.

Figure 10:
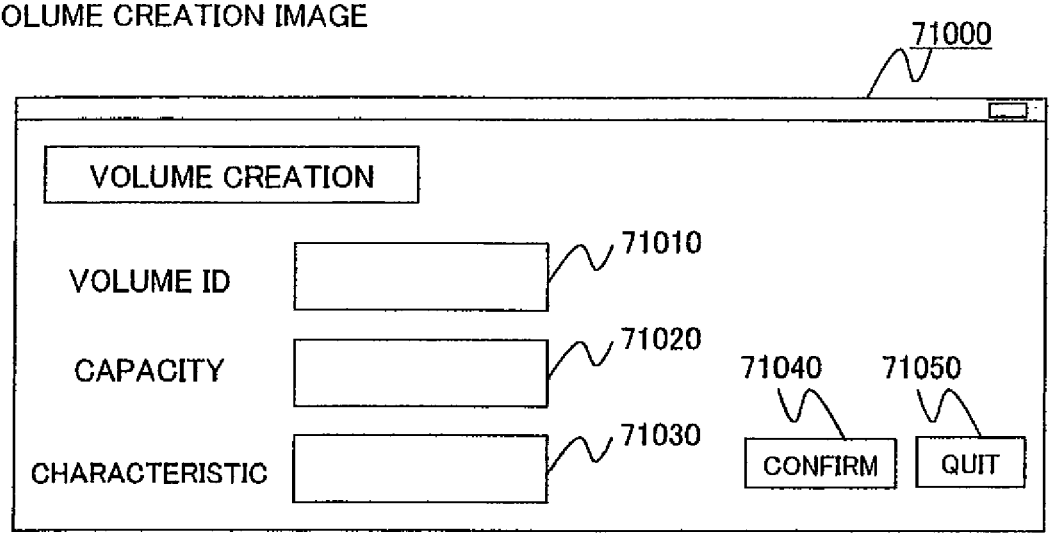
FIG. 10 shows an example of image displayed by a management computer of the first embodiment.

FIG. 10 shows a display example 71000 of a volume creation image displayed to a storage manager on a management computer when the storage manager creates a volume to a storage device using the management computer. On the volume creation image 71000, the volume ID of a volume created by the storage manager is specified (Table 71010), and after specifying the capacity of the volume (Table 71020), the characteristic of the volume is specified (Table 71030). When the manager confirms specified parameters and continues creation of the volume, the manager pushes down a 'Confirm' button 71040, and when stopping volume creation, the manager pushes down a 'Quit' button 71050. When the 'Quit' button is pushed down, a configuration management program of a management computer stops processes without creation of the volume. When the 'Confirm' button is pushed down, the configuration management program transmits a volume creation directive from the manager to the storage device. The management program 25000 of the storage device stores the ID and characteristic of the volume in a volume characteristic list 25400 after creation of the volume. After that, the management program 25000 refers to a disk drive list 25300 and stores the disk drive ID of the disk volume conforming to the characteristic of the volume in the volume characteristic list 25400.

Figure 11:
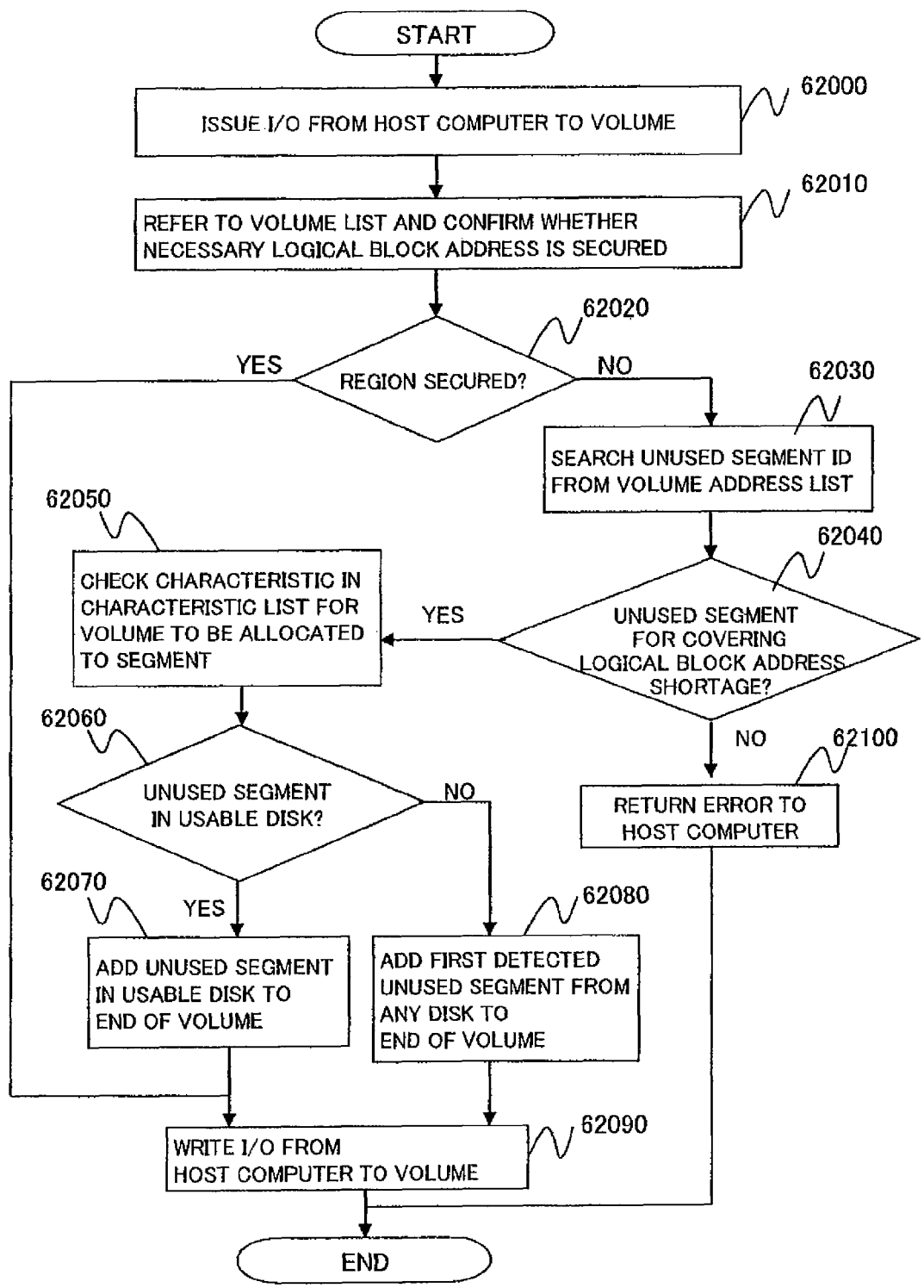
FIG. 11 shows a flowchart indicating an entire flow example of volume capacity automatic extending function executed by a storage device of the first embodiment.

FIG. 11 shows a flowchart of a volume capacity automatic extension function included in the management program 25000. Since Steps 62000 to 62020 are similar to the functions as previously done (Steps 61000 to 61020 in FIG. 6) and the description is omitted.

When a written region is not secured in the volume (Step 62020), the management program 25000 refers to the volume address list 25100 and searches for an unallocated segment for the volume (Step 62030). As a result of the search, when there is no unallocated segment, an error is returned to the host computer indicating that writing to the volume was failed (Step 62100).

In contrast, when there is an unallocated segment, the management program 25000 refers to the volume characteristic list 25400 and searches for a disk volume conforming to the characteristic of the volume (Step 62050). Next, the management program 25000 refers to the volume address list 25100 and checks whether or not an unallocated segment is in the disk volume conforming to the characteristic of the volume (Step 62060). When finding out an unallocated segment, the detected unallocated segment is added to the end of the volume (Step 62070). When not finding out an unallocated segment, the management program 25000 refers to volume address list 25100 and adds the unallocated segment which is first detected from any disk volume to the end of the volume (Step 62080). After that, the I/O from the host computer is written into the volume (Step 62090). Above all are the volume capacity automatic extension functions of the present embodiment.

According to the present embodiment, when a volume capacity is automatically extended, a storage manager can add a segment from a disk volume conforming to the characteristic applied to a volume. Accordingly, when there are a plurality of kinds of disk volumes in the storage device, an expensive disk volume and a low-cost disk volume can be selectively used according to the way of use.

It is also possible to use a 'Hint' specified by a standardization organization as a value to be added to the volume. 'Hint' can be set as a parameter given by digitizing into values from 1 to 10 a condition such as Availability, Cost with which a volume should satisfy. When there are a plurality of conditions defined by the 'Hint', the management program 25000 refers to the parameters set for each condition from a volume characteristic list 25400 and compares with each other. As a result of the comparison, the characteristic set for the volume is determined, and the disk volumes are allocated on the basis of the determined characteristic.

For example, when Availability or Cost is defined as 'Hint' for the condition with which the volume should satisfy and the parameter of Availability is large, following the management program 25000, the characteristic of the volume is determined to be reliable, and when Cost is larger, following the management program 25000, the characteristic of the volume is determined to be low-cost. It is also possible to allocate a disk volume satisfying a condition indicating a predetermined hint value or higher. As for the conditions of hint value, recording speed, failure rate, RAID level can be used in addition to Availability, Cost.

Second Embodiment

A second embodiment is described. In the present embodiment, access state of each segment in a volume is recorded by a management computer or a storage device, and when receiving a directive from a storage manager, the segment is transferred to a disk volume conforming to the access state to the segment.

Figure 12:
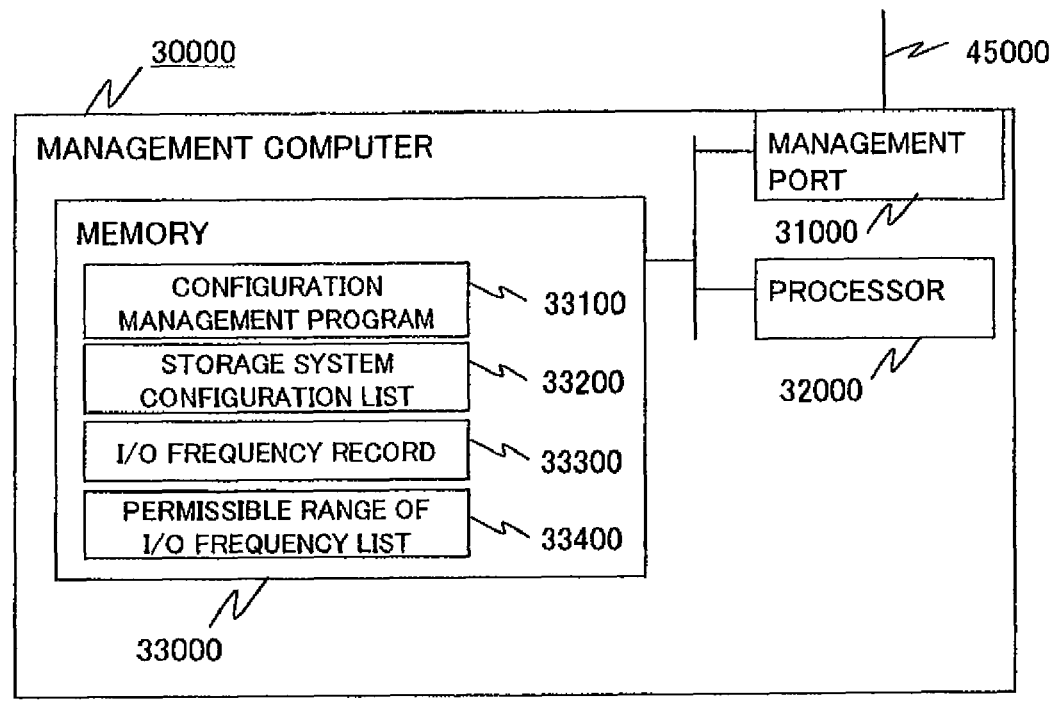
FIG. 12 shows an example of detailed constitution diagram of a management computer of a second embodiment.

The constitution of a computer system of the second embodiment is described. The constitution of the second embodiment is the same as that of the first embodiment except for adding an I/O frequency record 33300 and a permissible range of the I/O frequency list 33400 shown in FIG. 12 to a memory 33000 of a management computer 30000. Accordingly, only described are parts which are different from the first embodiment.

FIG. 13 shows the constitution of the I/O frequency record 33300. The I/O frequency record 33300 comprises a field 33310 for registering a volume ID as a sole identifier of each volume in a storage device, a field 33320 for registering a segment ID allocated to each volume, and a field 33330 for registering the I/O frequency from a host computer for a unit time period for each segment.

The management computer 30000 acquires the I/O frequency from the storage device 20000 at a constant interval and records the number in the I/O frequency record 33200. As a result, not only the I/O frequency at present but also data such as the average of the I/O frequency for the past one week can be also acquired.

FIG. 13 shows an example of specific values of the I/O frequency record included in the management computer. That is, the numbers of accesses of a segment SEG1 in a volume VOL1 at present, the average for the past 24 hours, and the average for the past one week are 100, 200 and 180, respectively.

FIG. 14 shows the constitution of the permissible range of the I/O frequency list 33400. The permissible range of the I/O frequency list 33400 comprises a field 33410 for registering the kind of a volume in the storage device, and a field 33420 for a storage manager to register the permissible range of I/O frequency from a host computer for a unit time period for each kind of disk volume.

The storage manager can specify the permissible range of the I/O frequency to the volume for a unit time period using the management computer 30000. The permissible range of the I/O frequency can be set for not only the I/O frequency at present but also the average of the I/O frequency for the past one week.

FIG. 14 shows an example of specific values of the permissible range of the I/O frequency list included in the management computer. That is, the lower limits of the I/O frequency of an FC disk at present, the average for the past 24 hours, and the average for the past one week are 50, 30 and 30, respectively, and the upper limits of the I/O frequency of an S-ATA disk at present, the average for the past 24 hours, and the average for the past one week are 100, 50 and 50, respectively.

Figure 15:
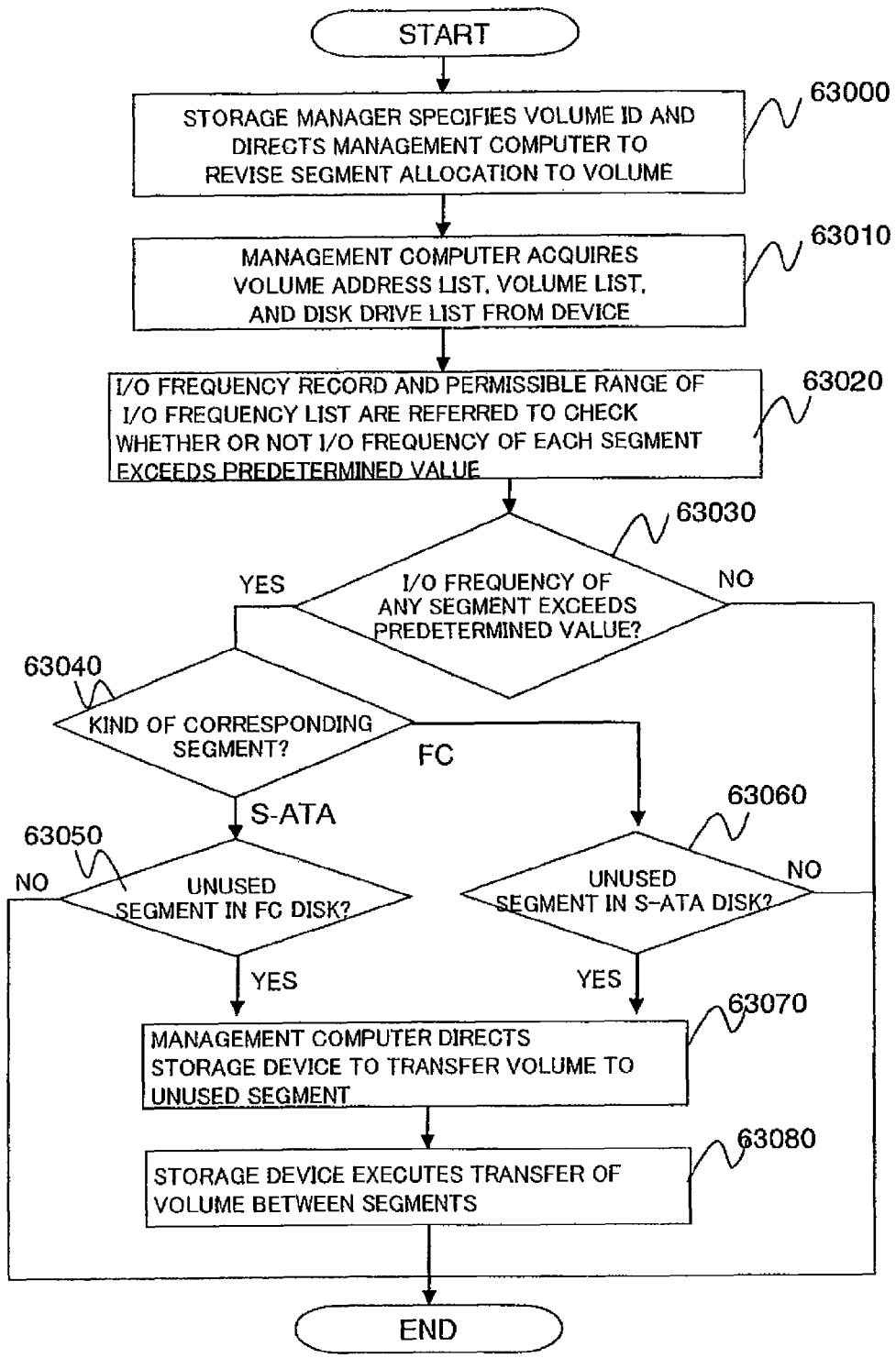
FIG. 15 shows a flowchart indicating an entire flow example of segment constitution revising process executed by a management computer of the second embodiment.

Next, a segment constitution revising process executed by a configuration management program 33100 is described. FIG. 15 shows a flowchart of the segment constitution revising process. A storage manager specifies a specific volume ID and directs a management computer to revise the segment allocation constitution to a volume according to the I/O frequency to a segment (Step 63000). The configuration management program 33100 directed by the storage manager accesses a storage device 20000, acquires a volume address list 25100, a volume list 25200 and a disk drive list 25300 from the device and registers them in a storage system configuration list 33200 (Step 63010).

Next, the configuration management program 33100 refers to the storage system configuration list 33200, the I/O frequency record 33300 and the permissible range of the I/O frequency list 33400 and checks whether or not the I/O frequency from the host computer for a segment in the specified volume exceeds a range defined in the permissible range of the I/O frequency list (Step 63020). When the numbers of accesses for all the segments do not exceed the defined range as a result of the checking (Step 63030), the segment constitution revising process ends.

When there is a segment of which I/O frequency exceeds the defined range (Step 63030), the kind of disk volume to which the segment belong is checked (Step 63040). When the kind of disk volume is an S-ATA disk, it is checked whether or not an unallocated segment is in an FC disk (Step 63050). When there is no unused segment in the FC disk, the segment constitution revising process ends. When the kind of disk volume is an FC disk, it is checked whether or not an unallocated segment is in an S-ATA disk (Step 63060). When there is no unused segment in the S-ATA disk, the segment constitution revising process ends.

When there are one or more disk volumes with an unallocated segment (Step 63040), the program directs the storage device 20000 to transfer the data of the segment with the I/O frequency exceeding the defined range to an unallocated segment (Step 63070). The directed storage device 20000 copies the data in an origin segment to a destination segment and records the constitution after transferring to the volume address list 25100 and the volume list 25200 (Step 63080), and the segment constitution revising process ends. Though a case whether or not exceeding the defined region is described here, it is also possible to determine whether or not being below the defined region. The segment constitution revising process is described above.

The definition and description of the I/O frequency and a method for setting a defined region of the I/O frequency are only examples. In spite of the I/O frequency, it is also possible to use the availability ratio of a desk volume to which a segment belongs for a unit time period as a parameter.

Figure 16:
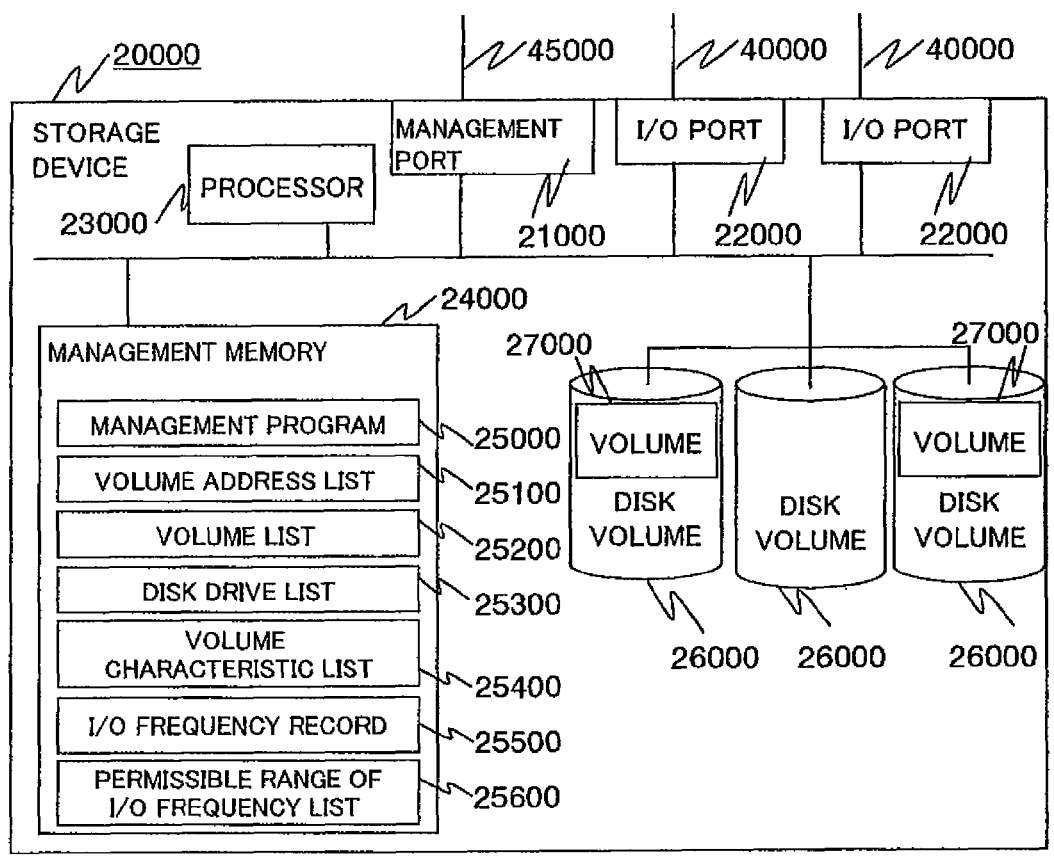
FIG. 16 shows an example of detailed constitution diagram of a management computer of the second embodiment.

Though the present embodiment is realized by that a management computer 30000 has an I/O frequency record 33300 and a permissible range of the I/O frequency list 33400, it is also possible, as shown in FIG. 16, that a storage device 20000 has the I/O frequency record 25500 and a permissible range of the I/O frequency list 25600. At that time, the segment constitution revising process is not started by the directive of a storage manager, but a similar process can be realized by normally monitoring the I/O frequency to a segment in a storage device and by starting the segment constitution revising process as soon as exceeding an upper limit defined in a permissible range of the I/O frequency list 25600.

According to the present embodiment as described above, a segment conforming to the characteristic of a disk volume can be allocated to a disk volume following the access state from a host computer to the segment.

According to the present embodiment, increase of costs can be prevented. That is, generally in a storage system, once a volume is allocated to a host computer, the same storage region is used until deletion of the volume. Accordingly, when a storage region is provided from an expensive disk drive to a volume requiring high performance and reliability, and the use frequency of the volume decreases as time passes, the expensive disk drive should be continuously used. This may cause increase of operation costs of the storage system. According to the present embodiment, such increase of costs can be prevented.

According to the present embodiment, the I/O frequency from the host computer into the volume can be recorded by the management computer or the storage system. That is, the storage manager registers for every kind of disk drives the limit range of I/O frequency to a storage region in the disk drive used by a logical group as a storage region. When receiving a directive from the storage manager, the management computer gives a directive to change a disk drive used by the volume as a storage region so as not deviate from the limit range.

Third Embodiment

A third embodiment is described. According to the present embodiment, an equivalent function as a volume capacity automatic extension function can be provided to a user using a storage device without a volume capacity automatic extension function by equipping a virtual volume management function to a host computer or a switch.

Figure 17:
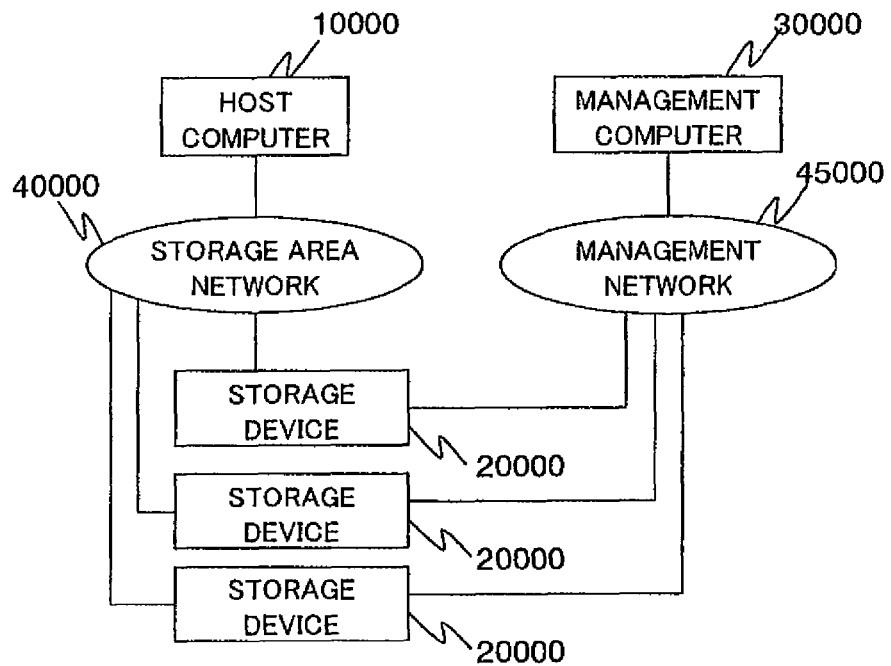
FIG. 17 shows an example of constitution diagram of a computer system of a third embodiment.
Figure 18:
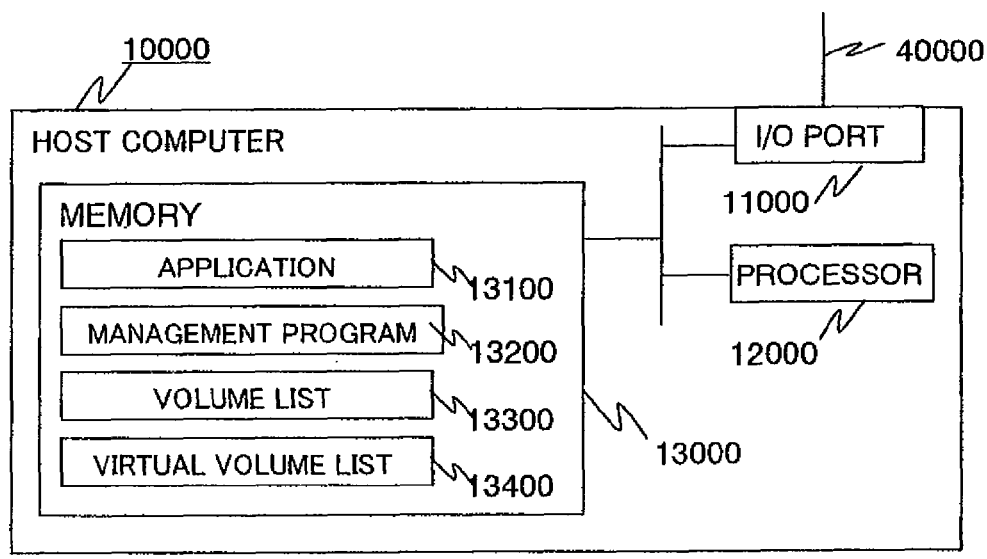
FIG. 18 shows an example of detailed constitution diagram of a host computer of the third embodiment.

The constitution of a computer system of the third embodiment is described. FIGS. 17 to 18 show the constitution of a computer system and that of devices connected to the computer system, and FIGS. 19 to 20 show management information included in each device.

FIG. 17 shows the constitution of the computer system. A plurality of storage devices 20000 are connected to a host computer 10000 via a storage network 40000. The storage device 20000 is connected to a management computer 30000 via a network 45000 for management. Since the constitution of the storage device 20000 and that of the management computer are identical to those in FIGS. 2 and 3, respectively, the description is omitted. The storage device 20000 does not have a volume capacity automatic extension function, differently from the first embodiment.

FIG. 18 shows an example of detailed constitution of a host computer 10000. The host computer 10000 has an I/O port 11000 for connection to a storage device via a storage network 40000, a processor 12000 for control of the host computer, and a memory 13000 used by the processor, all of which are connected to each other via a circuit such as an internal bus.

A memory 13000 includes an application 13100 for executing a job using a storage region in the storage device, and a management program 13200 for management of the storage region in the storage device connected to the host computer. The management program 13200 has a volume creation function and a virtual volume capacity automatic extension function. When receiving a volume creation directive from a storage manager, the volume creation function provides a virtual volume with a limitless capacity to the application. The virtual volume comprises one or more volumes. That is, when the host computer sees the virtual volume from the application 13100, the start value of a logical block number (LBA) for determining the volume range is defined to be 0 while the LBA as an end value of the range should not be defined. When the LBA as the end value of the range is defined, the value is a maximum capacity for the virtual volume. The virtual volume capacity automatic extension function will be described later in detail.

The memory 13000 stores a volume list 13300 as shown in FIG. 19 and a virtual volume list 13400 as shown in FIG. 20.

FIG. 19 shows the constitution of a volume list 13300 included in the host computer 10000. The volume list 13300 comprises a field 13310 for registering a storage device ID as an identifier of each storage device connected to the host computer, a field 13320 for registering a volume list held by each storage device, a field 13330 for registering a logical block address allocated to each volume, and a field 13340 for indicating whether or not each volume is allocated to the virtual volume.

FIG. 19 shows an example of specific values of a volume list included in the host computer. That is, the host computer is connected to a storage device indicated by storage device IDs such as ARRAY1, ARRAY2, and ARRAY3. The host computer recognizes the volumes indicated by volume IDs such as VOL1, VOL2, VOL3 of ARRAY1, the volumes indicated by volume IDs such as VOL4, VOL5 of ARRAY2, and the volumes indicated by volume IDs such as VOL6, VOL7 of ARRAY3, respectively. Each volume includes a storage region in proportion to the Logical block address held by the volume.

FIG. 20 shows the constitution of a virtual volume list 13400 included in the host computer 10000. The virtual volume list 13400 comprises a field 13410 for registering a virtual volume ID as an identifier of each virtual volume in the host computer, a field 13420 for registering a volume ID allocated to each virtual volume, and a field 13430 for indicating to which LBA the allocated volume is positioned in the virtual volume.

FIG. 20 shows an example of specific values of a virtual volume list included in the host computer. That is, in the host computer, a volume V-VOL1 uses the volumes VOL1, VOL2 and VOL4 as storage regions, and a volume V-VOL3 uses the volume VOL6 as a storage region.

Figure 21:
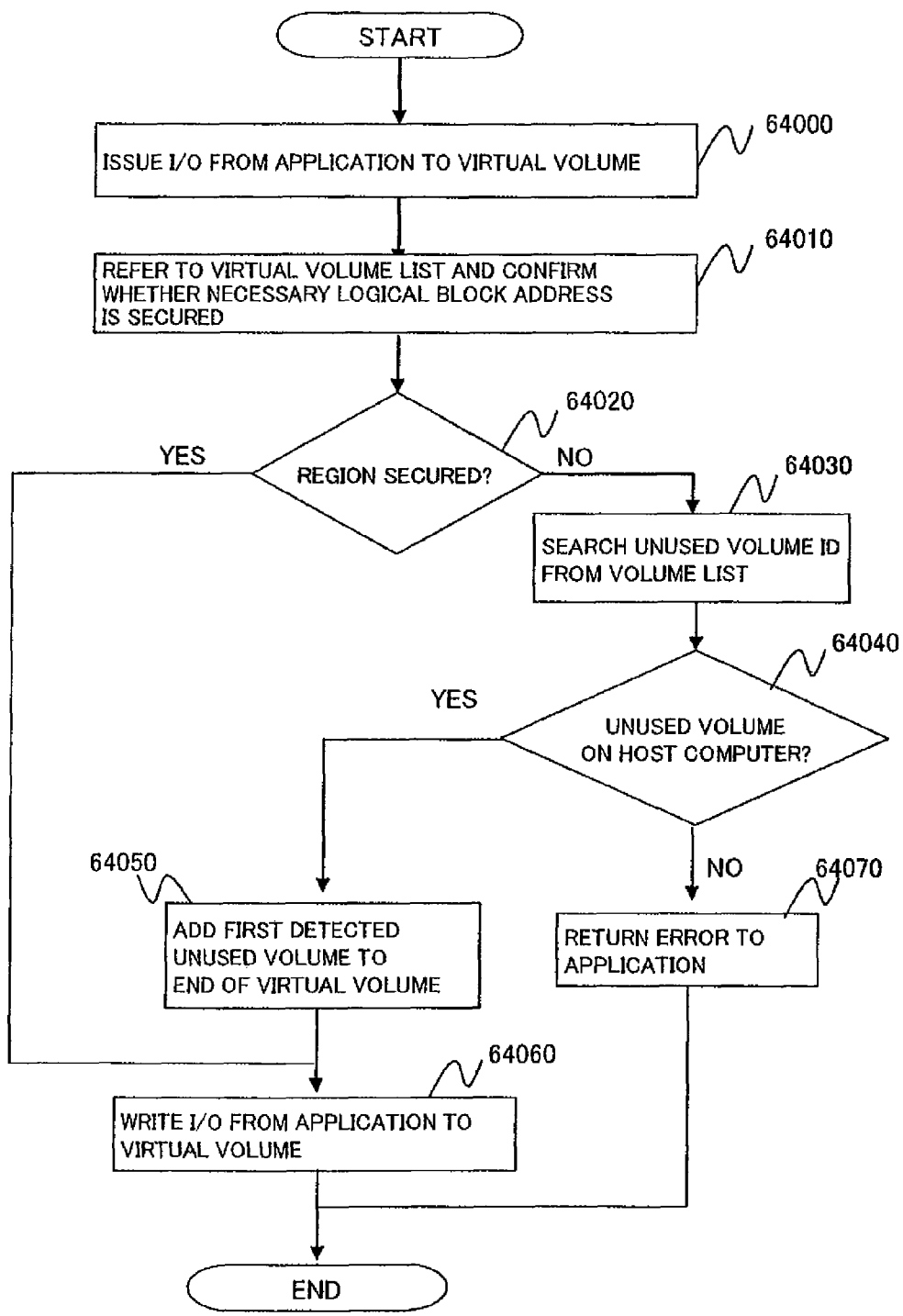
FIG. 21 shows a flowchart indicating an entire flow example of virtual volume capacity automatic extending function executed by a management computer of the third embodiment.

FIG. 21 shows a flowchart of a virtual volume capacity automatic extension function held by a management program 13200. An application 13100 issues an I/O to the virtual volumes allocated by the management program 13200 (Step 64000). At that time, the management program 13200 refers to the virtual volume list 13400 after detecting an LBA to be accessed on the virtual volume and checks whether or not a secured region is larger than the LBA to be accessed (Step 64010). When the secured region is larger than the LBA, or a written region is secured (Step 64020), the I/O from the application is written into the virtual volume (Step 64060).

On the other hand, when the secured region is smaller than the LBA, or a written region is not secured (Step 64020), the management program 13200 refers to the volume list 13300 and searches for an unallocated volume for the virtual volume (Step 64030). As a result of the search, when there is no unallocated volume, an error is returned to the application indicating that writing to the virtual volume being failed (Step 64070). When finding out an unallocated volume, the first detected unallocated logical group is added to the end of the virtual volume (Step 64050). After that, the I/O from the application is written into the virtual volume (Step 64060).

A method for holding a virtual volume capacity automatic extension function on a host computer is described above. It is also possible to hold the virtual volume capacity automatic extension function on a switch as a device for switching a network circuit between a storage device and the host computer. A computer system constitution formed in such a manner is described.

Figure 22:
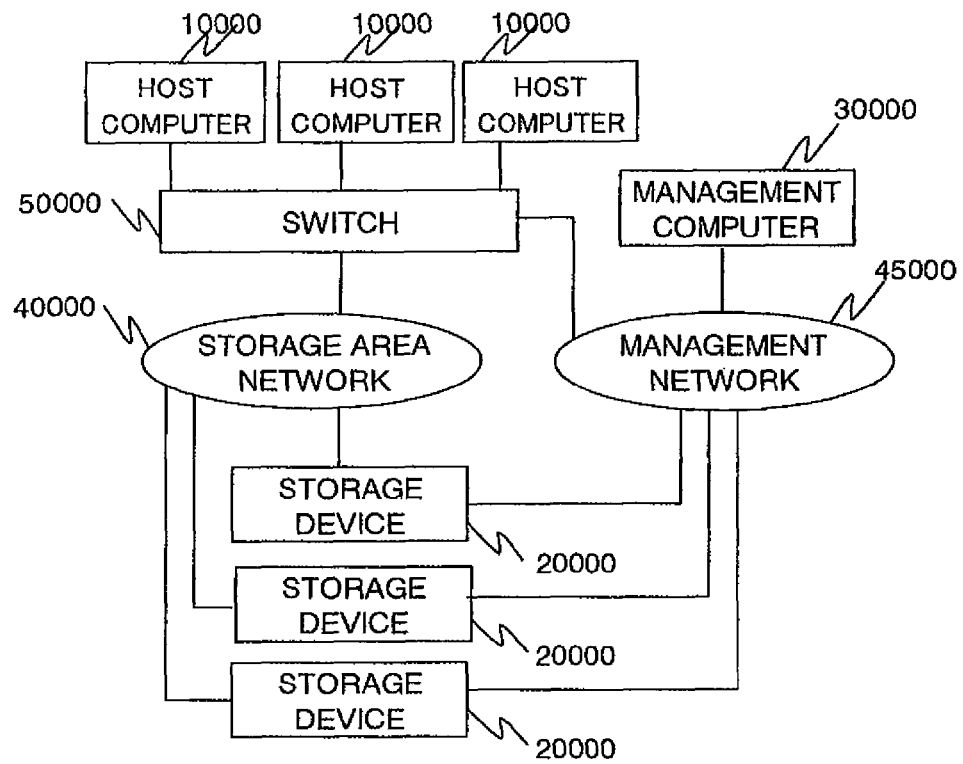
FIG. 22 shows an example of constitution diagram of a computer system of the third embodiment.

FIG. 22 shows the constitution of a computer system. A plurality of storage devices 20000 are connected to a plurality of host computers 10000 via a switch 50000. The switch 50000 is connected to a management computer 30000 via a network 45000 for management. Since the constitution of the host computer 10000, that of the storage device 20000 and that of the management computer 30000 are identical to those in FIGS. 17, 2 and 3, respectively, the description is omitted. The storage device 20000 does not have a volume capacity automatic extension function.

Figure 23:
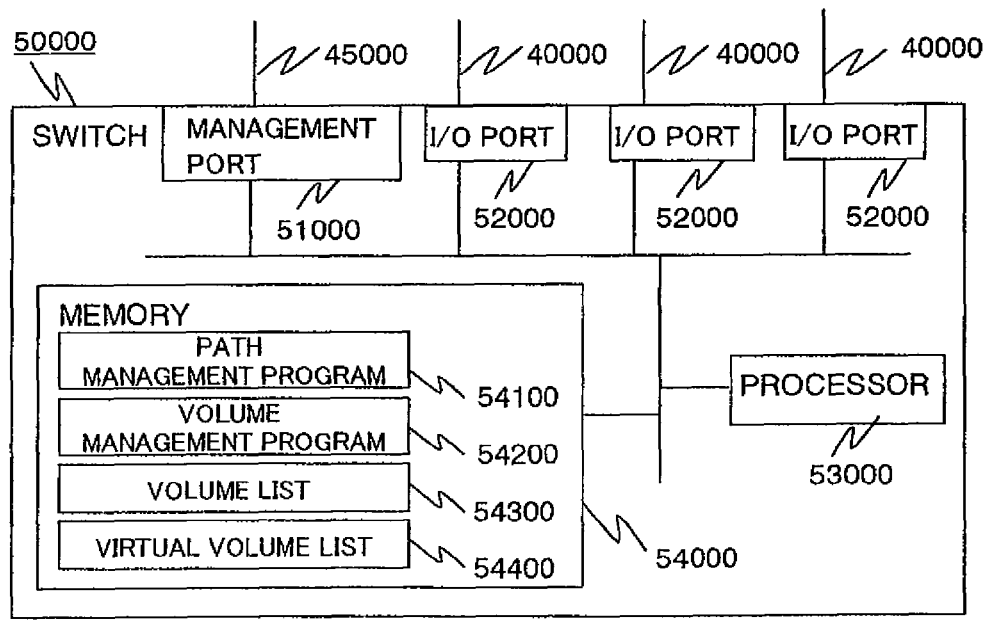
FIG. 23 shows an example of detailed constitution diagram of a switch of the third embodiment.

FIG. 23 shows an example of detailed constitution of the switch 50000. The switch 50000 includes a management port 51000 for connection to the network 45000 for management, an I/O port 52000 for connection to the storage device or host computer via a storage network 40000, a processor 53000 for controlling the switch, and a memory 54000 used by the processor, all of which are connected to each other via a circuit such as an internal bus.

A memory 54000 stores a path management program 54100 managing a connection state between the host computers 10000 connected to the switch and the storage device 20000 and switching a circuit in response to a directive of the management computer 30000, and a management program 54200 managing a storage region in the storage device connected to the switch. In addition, the memory 13000 stores a volume list 54300 and a virtual volume list 54400. Since these are identical to those described in FIGS. 19 and 20, the description is omitted. The management program 54200 has a virtual volume creation function and a virtual volume capacity automatic extension function. When receiving a volume creation directive from a storage manager, the virtual volume creation function provides a virtual volume with a limitless capacity to an application. Since the virtual volume capacity automatic extension function is identical to the one described in FIG. 21, the description is omitted. As described above, a virtual volume capacity automatic extension function can be provided to a switch.

By the above-mentioned virtual volume capacity automatic extension function, even in a computer system using a storage device without a volume capacity automatic extension function, an equivalent function can be realized. The volume capacity automatic extension function described in the first embodiment taking volume characteristic into consideration and a segment constitution revising process described in the second embodiment can be applied to the third embodiment by replacing a segment in the first and second embodiments to the volume in the third embodiment, the volume in the first and second embodiments to the virtual volume in the third embodiment, and the host computer in the first and second embodiments to the application in the host computer in the third embodiment, respectively.

According to the present embodiment, an equivalent function as the volume capacity automatic extension function can be provided. Thus, for a user storing data in a storage system without a volume capacity automatic extension function, in order to apply the volume capacity automatic extension function to a volume, it is necessary to transfer data to a storage system having the volume capacity automatic extension function. Transfer of data of the entire storage system might cause a large load to a storage manager as well as large costs such as a forced temporary stop of a job. It is also possible to provide an equivalent function as a volume capacity automatic extension function to a user using a storage system without a volume capacity automatic extension function.

In the present embodiment, a virtual volume can be allocated to an application on a host computer as a storage region. When the virtual volume capacity is running short due to writing from an application, the host computer can dynamically add an unused volume in the connected storage system to the storage region of a virtual volume during operation of the application.

According to the present invention, a storage region can be arranged in a kind of disk drive according to the use frequency by recording a limit range of the I/O frequency and by changing the arrangement of the storage region in the disk drive so as not to deviate from the limit range.

According to the present invention, an equivalent function as a volume capacity automatic extension function can be provided to a user using a storage system without a volume capacity automatic extension function by providing a logical group in a storage system connected to a host computer to an application on the host computer as a virtual volume.

As described above, another embodiment 1 according to the present invention is a computer system, wherein the physical storage device is a disk drive.

Another embodiment 2 according to the present invention is a computer system, wherein the physical storage device is an FC disk and/or an S-ATA disk.

Another embodiment 3 according to the present invention is a computer system, wherein the storage system receives the kind of physical storage device to be allocated to the volume from the management computer for recording.

Another embodiment 4 according to the present invention is a computer system, wherein the storage system receives the characteristic assigned to the physical volume from the management computer and records the kind of physical storage device corresponding to the characteristic as a kind of physical storage device to be allocated to the physical volume.

Another embodiment 5 according to the present invention is a computer system, wherein the characteristic assigned to the physical volume is a hint value.

Another embodiment 6 according to the present invention is a computer system, wherein the hint value is given by digitizing reliability, cost, recording speed, failure rate, or RAID level.

Another embodiment 7 according to the present invention is a computer system, wherein the storage system has a physical storage device management table on which the kind of physical storage device is recorded and creates a volume characteristic list on which the characteristic of the physical storage device is recorded from the physical storage device management table for selection of the physical storage device to be allocated to the physical volume.

Another embodiment 8 according to the present invention is a computer system, wherein the storage system records access quantity from a host computer corresponding to each segment while the management computer records a permissible range of the access quantity corresponding to each segment of the physical storage device of the storage system and transmits the data of the physical volume allocated to the segment with the access quantity exceeding the permissible range to the storage system so as to transfer the data to a kind of physical storage device corresponding to an access state.

Another embodiment 9 according to the present invention is a computer system, wherein the storage system records a permissible range of access quantity for each segment and the access quantity from the host computer for each segment for transferring the data of the physical volume allocated to the segment with the access quantity exceeding the permissible range to a kind of physical storage device corresponding to an access state.

Another embodiment 10 according to the present invention is a computer system having a storage system including a physical storage device and a plurality of host computers connected to the storage system via a network for reading/writing data in a volume, wherein the storage system includes a plurality of physical storage devices physically dividing into two or more segments the volume as a storage region used by the host computer for allocation and has a switch for changing network circuits between the storage system and a plurality of host computers, the switch making the host computer using the storage region in the storage device to recognize one or more volumes as one virtual volume, and wherein the storage system records the correspondence between each volume and the virtual volume using the volume as constitution information and allocates the volume to the virtual volume according to the correspondence between the recorded volume and virtual volume prior to performing an I/O access to the volume.

Another embodiment 11 according to the present invention is a storage system being connected to a management computer having an interface for receiving a constitution change directive from a host computer reading/writing data in a volume and a user via a network and including a logical storage device, wherein the storage system includes a plurality of kinds of physical storage devices physically dividing into two or more segments the volume as a storage region used by the host computer for allocation, and wherein the storage system records the correspondence between each segment and the volume using the segment as constitution information and the kind of physical storage device to be allocated to the volume and selects a physical storage device according to the recorded kind of physical storage device prior to performing an I/O access to the volume from the host computer for allocation of the segment.

Another embodiment 12 according to the present invention is a storage system, wherein the storage system receives the characteristic assigned to the physical volume from the management computer and records the kind of physical storage device corresponding to the characteristic as a kind of physical storage device to be allocated to the physical volume.

Another embodiment 13 according to the present invention is a storage system, wherein the storage system records a permissible range of access quantity for each segment and the access quantity from the host computer for each segment for transferring the data of the physical volume allocated to the segment with the access quantity exceeding the permissible range to a kind of physical storage device corresponding to an access state.

Another embodiment 14 according to the present invention is a method for extending volume capacity of a computer system including a physical storage device dividing into a plurality of segments a volume as a storage region used by a host computer for allocation and having a storage system which records as constitution information the correspondence between each segment and the volume using the segment and dynamically allocates the segment to the volume in response to an I/O access from the host computer to the volume, the host computer connected to the storage system via a network for reading/writing data in the volume, and a management computer being connected to the storage system and the host computer via the network and having an interface for receiving the constitution change directive from a user, wherein the computer system records to the storage system the kind of a plurality of physical storage devices to be allocated to the volume and selects the physical storage device for allocating the segment according to the kind of recorded physical storage device when the host computer performs an I/O access to the volume.

Another embodiment 15 according to the present invention is a method for extending a volume capacity of a computer system, wherein the computer system receives the kind of physical storage device to be allocated to the volume from the management computer for recording the kind to the storage system.

Another embodiment 16 according to the present invention is a method for extending a volume capacity of a computer system, wherein the computer system has access quantity recorded from the host computer corresponding to each segment, records the permissible range of the access quantity corresponding to each segment of the physical storage device of the storage system to the management computer, and transmits the data of the physical volume allocated to the segment with the access quantity exceeding the permissible range from the management computer to the storage system so as to transfer the data to a kind of physical storage device corresponding to an access state.

Another embodiment 17 according to the present invention is a method for extending a volume capacity of a computer system, wherein the computer system records a permissible range of access quantity for each segment to the storage system and the access quantity from the host computer for each segment to the storage system and transfers the data of the volume allocated to the segment with the access quantity exceeding the permissible range to a kind of physical storage device corresponding to an access state.

Another embodiment 18 according to the present invention is a management computer including a storage device having a disk drive physically dividing into a plurality of segments a volume as a storage region used by a host computer for allocation and recording as constitution information the correspondence between each segment and the volume using the segment for dynamically allocating the segment to the volume in response to an I/O access from the host computer to the volume, and an interface connected to the storage system via a network and connected to the storage device and the host computer of the computer system having the host computer for receiving/writing data in the volume via the network for receiving the constitution change directive from a user, wherein the management computer records the permissible range of access quantity for each segment of the disk drive of the storage device recording the access quantity for the host computer for each segment and transmits data of the volume allocated to the segment with access quantity exceeding the permissible range to a kind of disk drive according to an access state.

Another embodiment 19 according to the present invention is a host computer, wherein the host computer is connected via a network to a storage device of a computer system having a plurality of storage devices including a disk drive physically dividing into a plurality of segments the volume as a storage region used by the host computer for allocation and reads/writes data in the volume, and wherein the host computer makes an application using a storage region in the storage device to recognize one or more volumes as a virtual volume, records the correspondence between each volume and a virtual volume using the volume as constitution information and dynamically allocates the volume to the virtual volume according to the correspondence between the recorded volume and virtual volume prior to performing an I/O access to the volume.

Another embodiment 20 according to the present invention is a switch, wherein the switch easily changes a network circuit between a plurality of storage devices and a plurality of host computers of a computer system including a plurality of storage devices physically dividing into a plurality of segments the volume as a storage region used by the host computer for allocation and a plurality of host computers connected to the storage device via a network for reading/writing data in the volume, the switch making the host computer using the storage region in the storage device to one or more volumes as one virtual volume, and wherein the switch records the correspondence between each volume and the virtual volume using the volume as constitution information and dynamically allocates the volume to the virtual volume according to the correspondence between the recorded volume and virtual volume prior to performing an I/O access to the volume.

What is claimed is:

1. A computer system comprising:
    at least one first type of drive including a plurality of first storage regions;
    at least one second type of drive including a plurality of second storage regions; and
    a processor providing a logical volume which is accessed from a computer, controlling mapping information regarding a portion of said logical volume, and monitoring an access frequency of first storage regions and second storage regions that are mapped to said portion of said logical volume,
    wherein, when said access frequency of at least one first storage region, that is monitored by said processor, is higher than a predetermined value, said processor copies data in said at least one first storage region mapped to said portion of said logical volume, from said at least one first storage region to at least one second storage region which is not mapped to said portion of said logical volume, and
    wherein said processor changes said mapping information concerning said copied data from said at least one first storage region to said at least one second storage region.

2. The computer system according to claim 1, wherein,
    said processor receives a volume creation directive from a management computer and stores a volume capacity and a specifying characteristic for a created logical volume in a volume characteristic list.

3. The computer system according to claim 1, further comprising a switch for changing networks connections between the plurality of first storage regions and the plurality of second storage regions with a plurality of computers,
    wherein the switch provides at least one logical volume as a virtual volume to at least one of the plurality of computers.

4. The computer system according to claim 1, wherein the first type of drive is an FC drive.

5. The computer system according to claim 1, wherein said processor determines that a secured region of the logical volume is smaller than a logical block address which is to be accessed, and determines whether or not a volume address list has an unallocated segment for the logical volume.

6. The computer system according to claim 5, wherein said processor issues an error indicating writing to the logical volume failed when it is determined that the volume address list does not have an unallocated segment for the logical drive.

7. The computer system according to claim 1, further comprising a management computer, connected to the processor, having an I/O frequency record, a permissible range of I/O frequency list, and a storage system configuration list,
    wherein the management computer registers a volume address list, a volume list, and a disk drive list in the storage system configuration list.

8. The computer system according to claim 7, wherein the management computer determines whether an I/O frequency of a computer and a storage region allocated to a specified logical volume exceeds a range defined in the permissible range of I/O frequency list, and
    the management computer determines whether the storage region is the first type of drive or the second type of drive.

9. The computer system according to claim 8, wherein the management computer, if the storage region is the first type of drive, determines whether there is an unallocated portion of the second type of drive, and directs that data from the storage region is transferred to the unallocated portion of the second type of drive.

10. The computer system according to claim 8, wherein the management computer, if the storage region is the second type of drive, determines whether there is an unallocated portion of the first type of drive, and directs that data from the storage region is transferred to the unallocated portion of the first type of drive.

11. A method for a computer system, comprising:

controlling mapping information regarding a portion of a logical volume which is accessed from a computer and a plurality of first storage regions and a plurality of second storage regions, where the plurality of first storage regions includes at least one first type of drive and the plurality of second storage regions includes at least one second type of drive which is a different type of drive from said at least one first type of drive;

monitoring an access frequency of first storage regions and second storage regions mapped to said portion of said logical volume;

copying, when said access frequency of at least one first storage region, that is monitored by said processor, is higher than a predetermined value, data in at least one first storage region mapped to said portion of said logical volume, from said at least one first storage region to at least one second storage region which is not mapped to said portion of said logical volume; and changing mapping information concerning said copied data from said at least one first storage region to said at least one second storage region.

12. The method for a computer system according to claim 11, further comprising:

receiving a volume creation directive from a management computer, and storing a volume capacity and a specifying characteristic for a created logical volume in a volume characteristic list.

13. The method for a computer system according to claim 11, further comprising:

changing network connections between the plurality of first storage regions and the plurality of second storage regions with a plurality of computers via a switch, wherein the switch provides at least one logical volume as a virtual volume to at least one of the plurality of computers.

14. The method for a computer system according to claim 11, wherein the first type of drive is an FC drive.

15. The method for a computer system according to claim 11, further comprising:

determining whether or not a secured region of the logical volume is smaller than a logical block address which is to be accessed; and determining whether or not a volume address list has an unallocated segment for the logical volume.

16. The method for a computer system according to claim 15, further comprising:

issuing an error indicating writing to the logical volume failed when it is determined that the volume address list does not have an unallocated segment for the logical drive.

17. The method for a computer system according to claim 11, further comprising:

storing an I/O frequency record, a permissible range of I/O frequency list, and a storage system configuration list; and registering a volume address list, a volume list, and a disk drive list in the storage system configuration list.

18. The method for a computer system according to claim 17, further comprising:

determining whether an I/O frequency of a computer and a storage region allocated to a specified logical volume exceeds a range defined in the permissible range of I/O frequency list; and determining whether the storage region is the first type of drive or the second type of drive.

19. The method for a computer system according to claim 18, further comprising:

determining whether there is an unallocated portion of the second type of drive, if the storage region is the first type of drive; and directing that data from the storage region is transferred to the unallocated portion of the second type of drive.

20. The method for a computer system according to claim 18, further comprising:

determining whether there is an unallocated portion of the first type of drive, if the storage region is the second type of drive, and directing that data from the storage region is transferred to the unallocated portion of the first type of drive.

* * * * *